G. MELLIS.
NUT LOCK.
APPLICATION FILED MAR. 22, 1913.
1,116,095.
Patented Nov. 3, 1914.
Fig. 1.
Fig. 2.
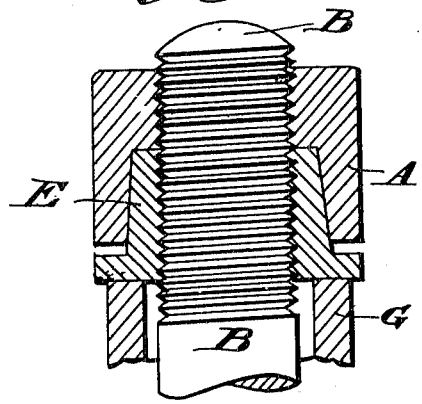
Fig. 3.
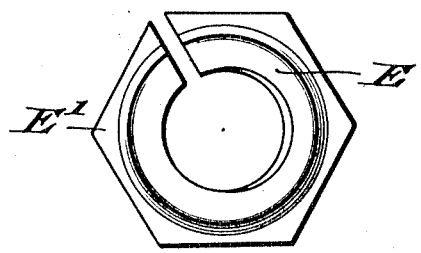
Fig. 6.
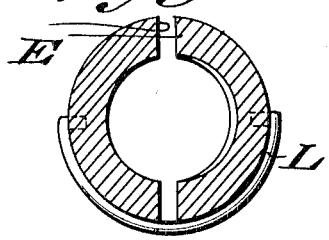
Fig. 4.
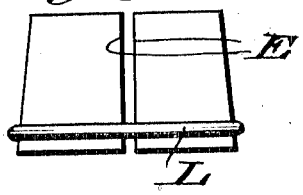
Fig. 5.
Witnesses:
A. E. S. Hausmann.
G. C. Denny
Inventor:
George Mellis
by Foster Freeman Watson & Coit
Atty.

UNITED STATES PATENT OFFICE.

GEORGE MELLIS, OF LONDON, ENGLAND.

NUT-LOCK.

1,116,095.  Specification of Letters Patent.  Patented Nov. 3, 1914.

Application filed March 22, 1913. Serial No. 756,198.

*To all whom it may concern:*

Be it known that I, GEORGE MELLIS, a subject of the King of England, residing at London, in England, have invented certain new and useful Improvements in or Relating to Nut-Locks, of which the following is a specification.

This invention relates to nut-locks of the kind in which the nut is formed with a truncated conical recess adapted to receive an internally screw threaded truncated conical bush. In order to secure a thorough lock it is necessary not only to compress the bush radially on the bolt by the coöperation of the conical surfaces, but also to produce a longitudinal grip on the threads, obtained from contact of the inner end of the bush with the base of the conical recess in the nut. Hitherto it has only been proposed to obtain this double grip in a nut-lock of the kind referred to in which the bush was wholly divided into two or more separate units but such a construction possesses great disadvantages in practice, since the separate parts of the bush are liable to be lost or mislaid and different sizes or varieties to be mixed. In some cases they are exceedingly awkward to place in position properly and are always apt to be slightly misplaced, resulting in one unit only contacting with the base of the recess in the nut, in which case the desired double grip is not obtained and often no lock at all is effected. Further although it has been stated that this simultaneous longitudinal and radial grip may be obtained with a bush divided into two or more separate units, no means have been described whereby it may be insured in action.

The object of the present inventin is to provide an improved construction of nut lock in which the desired double grip is obtained with a bush made as a single part thus removing the defects referred to above, and also to furnish an improved method of manufacturing the same, whereby the desired action in locking is insured.

In the accompanying drawings:—Figure 1 is a central longitudinal section of a nut lock according to this invention with the parts in position to be locked. Fig. 2 is a view similar to Fig. 1 showing the parts in the locked position. Fig. 3 is a plan of the bush. Fig. 4 is an elevation of a modification in the bush and Fig. 5 is a plan of a part shown in Fig. 4. Fig. 6 is a transverse section of the bush shown in Fig. 4.

Like letters indicate like parts throughout the drawings.

The nut A is tapped to fit the bolt B and is formed with a truncated conical recess C providing an annular surface or shoulder D surrounding the tapped portion of the nut.

The truncated conical bush E is tapped similarly to the nut and is divided or split longitudinally at one place from end to end by the entire removal of a thin section as shown in Fig. 3. The taper of the bush E is made exactly the same as that of the recess C as shown in Fig. 1 where the parts are shown in position before stress is exerted upon them in tightening the nut lock. The bush, however, is truncated at a distance from the apex of the cone somewhat greater than that at which the conical recess is truncated as indicated in Fig. 1. When in this position, with the construction described, it will be seen that if the nut A be tightened on the bolt B, the bush E will be forced farther into the recess C, the parallel and contacting conical surfaces of the bush and of the recess co-acting to produce a uniformly distributed inward or radial pressure on the bush throughout the part within the recess. The difference in the distance from the apex at which the two conical surfaces are truncated is such that having regard to the capacity of the bush to be pressed into closer contact with the threads of the bolt the two truncated surfaces (D of the recess and F of the bush) are pressed together when the desired radial compression of the bush is obtained by screwing the nut on to the bolt with the bush in contact with the surface G from which the bolt projects, or otherwise held from movement on the bolt. That is, with the bush adjusted to the desired position on a bolt, the nut may be screwed over the bush until the parts are in the relative position shown in Fig. 1. Further movement of the nut on the bush, by screwing it upon the bolt, will, while the nut is moving through the distance separating the end of the recess therein from the end of the bush, as represented in Fig. 1, exert radial pressure upon the bush sufficient to move the same toward the bolt through the distance corresponding to the normal fit of the bush on the bolt, which radial pressure, it will be seen, will be uniform throughout the length of the bolt engaged by the bush. As the truncated surfaces of the bush and nut contact, a direct longitudinal grip of the nut and bush upon all the threads inclosed thereby will be produced. In this manner it will be appreciated that there is simultaneously produced both a longitudinal grip on the bolt threads owing to the pressure exerted on the truncated surfaces D and F, and an equally distributed uniform inward gripping pressure on the bolt threads owing to the coöperation of the two conical surfaces, Fig. 2 showing the position of the parts when the nut has been tightened to set up these stresses.

The capacity of the bush to be pressed into closer contact with the threads of the bolt, is due, first, to the fact that a certain clearance is always allowed for between the threads of a nut and those of its bolt to enable the parts to be assembled and secondly to the entire removal of a thin section in dividing or splitting the bush. By measuring this capacity and the taper of the cone the difference in the distance from the apex at which the two conical surfaces are truncated may readily be calculated.

It will be appreciated that the more pronounced the taper of the conical surfaces is (that is to say the wider the angle of the cone) the smaller will be the distance between the truncated surfaces before the nut lock is tightened. Hence it is preferred only to provide the conical surfaces with a slight taper in order that this distance may be of appreciable dimensions and at the same time to allow sufficient latitude in the extent thereof for errors in machining. As an example, the preferred taper in a nut lock according to this invention for a half inch bolt is one in sixteen, and with the average fit of nut and bolt it is found that the bush when split is capable of being pressed nearly six thousandths of an inch closer to the bolt. Dividing this measurement by the taper ratio ($\frac{1}{16}$) gives approximately three thirty-seconds of an inch, which is the difference in the distance from the apex at which the two conical surfaces should be truncated. That is to say, when the bush is inserted into the recess without exerting pressure, the two truncated surfaces should be approximately three thirty-seconds of an inch apart. With this construction if the bush be split at one place from end to end by the entire removal of a section one sixteenth of an inch thick (which may be conveniently effected in a milling machine with a milling cutter one sixteenth of an inch thick) the desired simultaneous longitudinal and radial pressure will be exerted on the bush when the nut lock is tightened. It will be seen that the distance the bush is pressed closer to the bolt is half the reduction in diameter of the bush which occurs when the pressure is exerted.

As a general rule it is preferred to employ approximately the same taper in the conical surfaces of one in sixteen in all nuts, the other dimensions being varied or not according to circumstances.

Where the circumstances of use admit the bush projecting beyond the nut A, it is preferred to form the bush with a flange $E^1$ at its outer end or base. As shown in Fig. 3 this flange is hexagonal, corresponding to the external shape of the nut A, its object being to provide convenient means for screwing the bush E to the surface G before the nut lock is tightened or holding the bush against rotation while the nut is tightened thereon. The flange is situated at such a distance from the truncated surface F of the bush that when the nut A is screwed home to tighten the lock, the flange is not in contact with the adjacent end of the nut, otherwise the essential conditions for successful operation of the lock might be absent, as the bush would not then necessarily be in longitudinal pressure throughout its length, there being a possibility of such longitudinal pressure being exerted only on the flange.

The stresses which are set up when the nut-lock is tightened may be adjusted by inserting one or more washers within the recess C to be pressed between the two truncated surfaces, and by filing the smaller end of the bush or otherwise removing metal from either of the two truncated surfaces. The washers will increase the longitudinal grip on the bolt threads and reduce the radial compression on the bush, and removal of metal from either truncated surface will have an exactly opposite effect, lessening the longitudinal pressure and increasing the radial grip.

As a modification, in cases where the circumstances of use admit the bush projecting beyond the nut A, the bush may be divided into two or more segments which are connected together to form a single part, in such manner as to allow of relative movement of the segments varying the diameter of the bush in order that the radial compression set up in operation may be evenly distributed.

Figs. 4, 5 and 6 illustrate a method of connecting the segments together according to which they are each provided with a hole or depression into which the bent in ends of a spring yoke L or the like are sprung.

What I claim and desire to secure by Letters Patent is:—

1. In a nut-lock, the combination with a nut having a truncated conical recess with an annular surface at the end thereof, of a truncated conical bush, tapped similarly to the nut and split on one side throughout its length and having the same taper as the recess in the nut but truncated at a distance from the apex of the common generating cone of said bush and recess greater than that at which said recess is truncated, whereby when the nut is adjusted longitudinally of the bush, by being screwed on the bolt, sufficiently to exert radial pressure on the bush, such pressure will be uniform throughout the area of the bolt engaged by the bush, and subsequently the co-action of the truncated surfaces of the bush and recess will produce a direct longitudinal grip of the nut and bush upon all of the threads inclosed thereby, the threaded portion of the nut being of sufficient length to provide the requisite number of threads to sustain the longitudinal stress upon the nut.

2. In a nut-lock, the combination with a nut having a truncated conical recess with an annular surface at the end thereof, of a truncated conical bush, tapped similarly to the nut and split on one side throughout its length and having the same taper as the recess in the nut but truncated at a distance from the apex of the common generating cone of said bush and recess greater than that at which said recess is truncated, the difference in the distances from said apex at which the two conical surfaces are truncated being equivalent to the distance the bush is capable of being moved toward the bolt from its initial position within the nut divided by the taper ratio of the cone, whereby when the nut is adjusted longitudinally of the bush, by being screwed on the bolt, sufficiently to exert radial pressure on the bush, such pressure will be uniform throughout the area of the bolt engaged by the bush, and subsequently the co-action of the truncated surfaces of the bush and recess will produce a direct longitudinal grip of the nut and bush upon all of the threads inclosed thereby, the threaded portion of the nut being of sufficient length to provide the requisite number of threads to sustain the longitudinal stress upon the nut.

3. In a nut lock the combination with a nut having a truncated conical recess with an annular surface at the end thereof of a truncated conical bush of greater length than the recess, tapped similarly to the nut, split longitudinally into separate segments with the entire removal of a thin section and having the same taper as that of the recess but being truncated at such a distance from the apex of the cone greater than that at which the conical recess is truncated that the two truncated surfaces are pressed together when the desired amount of radial compression of the bush is obtained by screwing the nut on its bolt with the bush in contact with the surface from which the bolt projects whereby the production of a direct longitudinal grip of the nut and bush upon all the bolt threads inclosed thereby is also insured and means for connecting the bush segments together so as to be capable of relative movement varying the diameter of the bush substantially as set forth.

4. In a nut lock the combination with a nut having a truncated conical recess with an annular surface at the end thereof of a truncated conical bush of greater length than the recess, tapped similarly to the nut, split longitudinally into two separate segments with the entire removal of a thin section and having the same taper as that of the recess but being truncated at such a distance from the apex of the cone greater than that at which the conical recess is truncated that the two truncated surfaces are pressed together when the desired amount of radial compression of the bush is obtained by screwing the nut on its bolt with the bush in contact with the surface from which the bolt projects whereby the production of a direct longitudinal grip of the nut and bush upon all the bolt threads inclosed thereby is also insured, a recess in each segment toward the larger end and a spring yoke having turned in ends engaging such recesses substantially as set forth.

In testimony whereof I have signed my name to this specification in the presence of two subscribing witnesses.

GEORGE MELLIS.

Witnesses:
ARTHUR H. GREENWOOD,
LUTHER J. PARR.